(12) United States Patent
Fotheringham et al.

(10) Patent No.: US 7,710,624 B2
(45) Date of Patent: May 4, 2010

(54) CONTROLLING THE TRANSMISSION AMPLITUDE PROFILE OF A COHERENT LIGHT BEAM IN A HOLOGRAPHIC MEMORY SYSTEM

(75) Inventors: Edeline Fotheringham, Boulder, CO (US); Ken E. Anderson, Boulder, CO (US); Larry Fabiny, Boulder, CO (US); Alan Hoskins, Denver, CO (US)

(73) Assignee: InPhase Technologies, Inc., Longmont, CO (US)

( * ) Notice: Subject to any disclaimer, the term of this patent is extended or adjusted under 35 U.S.C. 154(b) by 185 days.

(21) Appl. No.: 11/440,357

(22) Filed: May 25, 2006

(65) Prior Publication Data

US 2006/0274393 A1    Dec. 7, 2006

Related U.S. Application Data

(60) Provisional application No. 60/684,531, filed on May 26, 2005.

(51) Int. Cl.
G02B 5/32 (2006.01)
G03H 1/00 (2006.01)

(52) U.S. Cl. .............................. 359/15; 359/19; 359/30

(58) Field of Classification Search .................. 359/30, 359/19
See application file for complete search history.

(56) References Cited

U.S. PATENT DOCUMENTS

| | | | |
|---|---|---|---|
| 4,013,338 A * | 3/1977 | Sato et al. | 359/29 |
| 4,834,476 A * | 5/1989 | Benton | 359/23 |
| 5,007,690 A * | 4/1991 | Chern et al. | 359/11 |
| 5,066,088 A | 11/1991 | Davies et al. | |
| 5,123,073 A | 6/1992 | Pimpinella | |
| 5,499,732 A | 3/1996 | Nishimoto | |
| 5,500,910 A | 3/1996 | Boudreau et al. | |
| 5,692,083 A | 11/1997 | Bennett | |
| 5,710,672 A | 1/1998 | Roberts et al. | |
| 5,719,691 A | 2/1998 | Curtis et al. | |
| 5,796,500 A * | 8/1998 | Hart | 359/24 |
| 5,886,971 A | 3/1999 | Feldman et al. | |
| 5,912,872 A | 6/1999 | Feldman et al. | |
| 5,932,045 A | 8/1999 | Campbell et al. | |
| 5,956,106 A | 9/1999 | Peterson et al. | |

(Continued)

FOREIGN PATENT DOCUMENTS

WO    WO 2005/059902 A3    6/2005

OTHER PUBLICATIONS

Y. Nakayama, et al., "Diffuser with Pseudorandom Phase Sequence," *Opt. Soc. Am.*, vol. 69 (No. 10), (Oct. 1979), pp. 1367-1372.

(Continued)

*Primary Examiner*—Stephone B Allen
*Assistant Examiner*—Jade R Callaway
(74) *Attorney, Agent, or Firm*—Vedder Price P.C.; Ajay A. Jagtiani (57) ABSTRACT

Holographic systems which shape coherent light beams are disclosed. These holographic systems may beam-shaping devices positioned in the path of coherent light beams to shape a coherent light beam into an essentially diffraction noise free coherent light beam of predetermined dimensions that has a continuous light beam profile of distinct intensity zones.

15 Claims, 10 Drawing Sheets

U.S. PATENT DOCUMENTS

| | | | |
|---|---|---|---|
| 6,078,442 A * | 6/2000 | Tada et al. | 359/890 |
| 6,081,381 A | 6/2000 | Shalapenok et al. | |
| 6,103,454 A | 8/2000 | Dhar et al. | |
| 6,104,690 A | 8/2000 | Feldman et al. | |
| 6,137,601 A | 10/2000 | Khoury et al. | |
| 6,265,240 B1 | 7/2001 | Dautartas et al. | |
| 6,344,148 B1 | 2/2002 | Park et al. | |
| 6,389,045 B1 | 5/2002 | Mann et al. | |
| 6,482,551 B1 | 11/2002 | Dhar et al. | |
| 6,650,447 B2 | 11/2003 | Curtis et al. | |
| 6,743,552 B2 | 6/2004 | Setthachayanon et al. | |
| 6,747,257 B1 | 6/2004 | Farnsworth et al. | |
| 6,765,061 B2 | 7/2004 | Dhar et al. | |
| 6,768,426 B2 | 7/2004 | Nekado et al. | |
| 6,780,546 B2 | 8/2004 | Trentler et al. | |
| 6,796,697 B1 | 9/2004 | Bragg et al. | |
| 6,862,121 B2 | 3/2005 | Psaltis et al. | |
| 6,909,529 B2 | 6/2005 | Curtis | |
| 6,925,225 B2 | 8/2005 | Engel et al. | |
| 6,956,998 B2 | 10/2005 | Shahar et al. | |
| 6,992,805 B2 | 1/2006 | Ingwall et al. | |
| 7,027,197 B2 | 4/2006 | Newswanger et al. | |
| 7,161,140 B2 * | 1/2007 | Grier et al. | 250/251 |
| 2003/0206320 A1 | 11/2003 | Cole et al. | |
| 2004/0027625 A1 | 2/2004 | Trentler et al. | |
| 2004/0027668 A1 | 2/2004 | Ayres | |
| 2004/0223330 A1 | 11/2004 | Broude et al. | |
| 2004/0240015 A1 * | 12/2004 | Newswanger et al. | 359/35 |
| 2005/0013231 A1 | 1/2005 | Kawano et al. | |
| 2005/0041000 A1 | 2/2005 | Plut | |
| 2005/0141810 A1 | 6/2005 | Vaez-Iravani et al. | |
| 2005/0146762 A1 | 7/2005 | Hoogland et al. | |
| 2005/0190451 A1 | 9/2005 | Hansen | |
| 2005/0270855 A1 | 12/2005 | Earhart et al. | |
| 2005/0270856 A1 | 12/2005 | Earhart et al. | |
| 2005/0286388 A1 | 12/2005 | Ayres et al. | |
| 2006/0274393 A1 | 12/2006 | Fotheringham et al. | |
| 2006/0274394 A1 | 12/2006 | Riley et al. | |
| 2006/0275670 A1 | 12/2006 | Riley et al. | |
| 2006/0279818 A1 | 12/2006 | Ayres et al. | |
| 2006/0279819 A1 | 12/2006 | Krneta et al. | |
| 2006/0279820 A1 | 12/2006 | Riley et al. | |
| 2006/0279821 A1 | 12/2006 | Riley et al. | |
| 2006/0279822 A1 | 12/2006 | Krneta et al. | |
| 2006/0279823 A1 | 12/2006 | Riley et al. | |
| 2006/0279824 A1 | 12/2006 | Riley et al. | |
| 2006/0280096 A1 | 12/2006 | Riley et al. | |
| 2006/0281021 A1 | 12/2006 | Riley et al. | |
| 2006/0291022 A1 | 12/2006 | Redmond et al. | |
| 2006/0291023 A1 | 12/2006 | Riley et al. | |

OTHER PUBLICATIONS

Smothers, et al., "Photopolymers for Holography," *SPIE OE/Laser Conference*, (Los Angeles, Calif., 1990), pp. 1212-1303.

Psaltis, et al., "Holographic Memories," *Scientific American*, Nov. 1995.

Dhar, L., et al., "Recording Media That Exhibit High Dynamic Range for Holographic Storage," *Optics Letters*, 24, (1999): pp. 487 et. seq.

Dickey, "Laser Beam Shaping," Optics & Photonics News (Apr. 2003), pp. 30-35.

Masters, A. et al., "Beam-Shaping Optics Expand Excimer Laser Applications," Laser Focus World (Jun. 2005).

Fuertes, J.M., et al., "Absolute Type Shaft Encoding Using LFSR Sequences With Prescribed Length".

McLeod, et al. "Micro-Holographic Multi-Layer Optical Disk Data Storage," *International Symposium on Optical Memory and Optical Data Storage* (July 2005).

Shelby, "Media Requirements for Digital Holographic Data Storage," *Holographic Data Storage*, Section 1.3 (Coufal, Psaltis, Sincerbox Eds. 2003).

* cited by examiner

CONTROLLING THE TRANSMISSION AMPLITUDE PROFILE OF A COHERENT LIGHT BEAM IN A HOLOGRAPHIC MEMORY SYSTEM

CROSS-REFERENCE TO RELATED APPLICATIONS

This application makes reference to and claims the benefit of the following co-pending U.S. Provisional Patent Application No. 60/684,531 filed May 26, 2005. The entire disclosure and contents of the foregoing Provisional Application is hereby incorporated by reference. This application also makes reference to the following co-pending U.S. Patent Applications. The first application is U.S. application Ser. No. 11/440,370, entitled "Illuminative Treatment of Holographic Media," filed May 25, 2006. The second application is U.S. application Ser. No. 11/440,446, entitled "Methods and Systems for Laser Mode Stabilization," filed May 25, 2006. The third application is U.S. application Ser. No. 11/440,447, entitled "Phase Conjugate Reconstruction of Hologram," filed May 25, 2006. The fourth application is U.S. application Ser. No. 11/440,448, entitled "Improved Operational Mode Performance of a Holographic Memory System," filed May 25, 2006. The fifth application is U.S. application Ser. No. 11/440,359, entitled "Holographic Drive Head and Component Alignment," filed May 25, 2006. The sixth application is U.S. application Ser. No. 11/440,358, entitled "Optical Delay Line in Holographic Drive," filed May 25, 2006. The seventh application is U.S. application Ser. No. 11/440,372, entitled "Sensing Absolute Position of an Encoded Object," filed May 25, 2006. The eighth application is U.S. application Ser. No. 11/440,371, entitled "Sensing Potential Problems in a Holographic Memory System," filed May 25, 2006. The ninth application is U.S. application Ser. No. 11/440,367, entitled "Post-Curing of Holographic Media," filed May 25, 2006. The tenth application is U.S. application Ser. No. 11/440,365, entitled "Post-Curing of Holographic Media," filed May 25, 2006. The eleventh application is U.S. application Ser. No. 11/440,366, entitled "Erasing Holographic Media," filed May 25, 2006. The eleventh application is U.S. application Ser. No. 11/440,365, entitled "Laser Mode Stabilization Using an Etalon," filed May 25, 2006. The twelfth application is U.S. application Ser. No. 11/440,369, entitled "Holographic Drive Head Alignments," filed May 25, 2006. The thirteenth application is U.S. application Ser. No. 11/440,368, entitled "Replacement and Alignment of Laser," filed May 25, 2006. The entire disclosure and contents of the foregoing U.S. Patent Applications are hereby incorporated by reference.

BACKGROUND

1. Field of the Invention

The present invention relates generally to holographic memory systems, and more particularly, to controlling the transmission amplitude profile of a coherent light beam in a holographic memory system.

2. Related Art

Developers of information storage devices continue to seek increased storage capacity. As part of this development, memory systems employing holographic optical techniques, referred to herein as holographic memory systems, have been suggested as alternatives to conventional memory devices.

Typically, holographic memory systems read/write data to/from a photosensitive storage medium. Such systems typically access holographic representations (i.e., holograms) substantially throughout the spatial extent of the storage medium. This allows holographic memory systems to advantageously store a large amount of data.

Holographic memory systems may be designed to record data as single bits of information (i.e., bit-wise data storage). See McLeod et al. "Micro-Holographic Multi-Layer Optical Disk Data Storage," *International Symposium on Optical Memory and Optical Data Storage* (July 2005). Holographic memory systems may also be designed to record an array of data that may be a 1-dimensional linear array (i.e., a 1×N array, where N is the number linear data bits), or a 2-dimension array commonly referred to as a "page-wise" memory system. Page-wise memory systems may involve the storage and readout of an entire two-dimensional representation (i.e., a page) of data.

Holographic memory systems typically involve the three-dimensional storage of holograms as a pattern of varying refractive index and/or absorption imprinted into the storage medium. In general, holographic memory systems operate to perform a data write (also referred to as a data record or data store operation, simply "write" operation herein) by combining two coherent light beams at a particular point within the storage medium. Specifically, a data-encoded light beam is combined with a reference light beam to create an interference pattern in the photosensitive storage medium. The interference pattern induces material alterations in the storage medium to form a hologram. The formation of the hologram is a function of the relative amplitudes, phase, coherence, and polarization states of the data-encoded and reference light beams. It is also dependent on the relative wavelength of the incident beams as well as the three-dimensional geometry at which the data and reference beams are projected into the storage medium.

Holographically-stored data is retrieved from the holographic memory system by performing a read (or reconstruction) of the stored data. The read operation is performed by projecting a reconstruction or probe beam into the storage medium at the same angle, wavelength, phase and position as the reference beam used to record the data, or compensated equivalents thereof. The hologram and the reconstruction beam interact to reconstruct the data beam. The reconstructed data beam is then detected by a sensor, such as a photodetector, sensor array, camera, etc. The reconstructed data is then processed for delivery to an output device.

The large storage capacity of holographic memory systems has been made possible, in part, by the development of high performance photopolymer materials for use as the holographic storage medium. Photopolymer mediums allow fast and durable recording of many superposed holograms, increasing both the speed and storage capacity of holographic memory systems. Accordingly, it is desirable to develop holographic memory systems that efficiently write to and read from photopolymer storage medium.

SUMMARY

In one aspect of the invention, an optical device is disclosed. The device comprising: a beam-shaping device configured to shape an incident coherent light beam into an essentially diffraction noise free coherent light beam of predetermined dimensions, wherein said shaped coherent light beam having a continuous light beam profile of distinct intensity zones.

In a further aspect of the invention, said distinct intensity zones comprise three distinct intensity zones. In a still further aspect of the invention, said three distinct intensity zones comprise: an outer zone having zero light intensity; an inner zone having high light intensity; and an transition zone having varying intensity.

In another aspect of the invention, a Holographic Data Storage (HDS) drive system is disclosed. The system comprising: a recording medium configured to holographically store information; at least one source of coherent light configured to produce a coherent light beam; and an optical steering subsystem comprising: at least one beam-shaping device configured to shape said coherent light beam into an essentially diffraction noise free coherent light beam of predetermined dimensions, wherein said shaped coherent light beam having a continuous light beam profile of distinct intensity zones at said holographic recording medium.

In another aspect of the invention, a method of recording a hologram in a Holographic Data Storage (HDS) drive system is disclosed. The method comprising: providing a recording medium configured to holographically store information; providing at least one source of coherent light configured to produce a coherent light beam; and directing said coherent light through an optical steering subsystem configured to divide said coherent light into a plurality of discrete light beams, wherein said optical steering subsystem comprises: a plurality of beam-shaping devices configured to shape said plurality of discrete light beams into essentially diffraction noise free coherent light beams of predetermined dimensions, and wherein said shaped coherent light beams having continuous light beam profiles of distinct intensity zones at said recording medium.

BRIEF DESCRIPTION OF THE DRAWINGS

Embodiments of the present invention will be described in conjunction with the accompanying drawings, in which.

DETAILED DESCRIPTION

Aspects of the present invention are generally directed to controlling the transmission amplitude, or intensity, profile of a coherent light beam in, for example, a holographic memory system. In certain applications, the present invention is embodied in a beam shaping device positioned in the path of at least one coherent light beam. The device shapes the coherent light beam into a substantially diffraction noise-free coherent light beam referred to herein as a soft-edged coherent light beam. The soft-edged coherent light beam has a mathematically-continuous intensity profile comprising a plurality of radially-successive circumferential intensity zones. The intensity zones include a varying intensity zone adjacent to a substantially constant intensity zone or, more commonly, disposed between two constant intensity zones. The intensity of the coherent light beam in the varying intensity zones changes gradually from the intensity of the adjacent constant intensity zone to another intensity such as the intensity of the opposing adjacent constant intensity zone. Thus, the intensity profile of the soft-edged coherent light beam comprises intensity zones having an intensity that is either substantially constant or transitions gradually along radial lines extending from the center to the edge of the coherent light beam. The lack of discrete incremental changes in the intensity profile results in a coherent light beam that is substantially free of diffraction noise.

Beam shaping devices of the present invention may take several different forms or arrangements, some embodiments of which are described below. One embodiment of the beam shaping device comprises a variable transmission apodizer. Another embodiment comprises a Non-Sharp Imaging device. A further embodiment of the beam shaping device comprises a Holographic Optical Element (HOE). Each of these exemplary embodiments is described in detail below.

Figure 1:
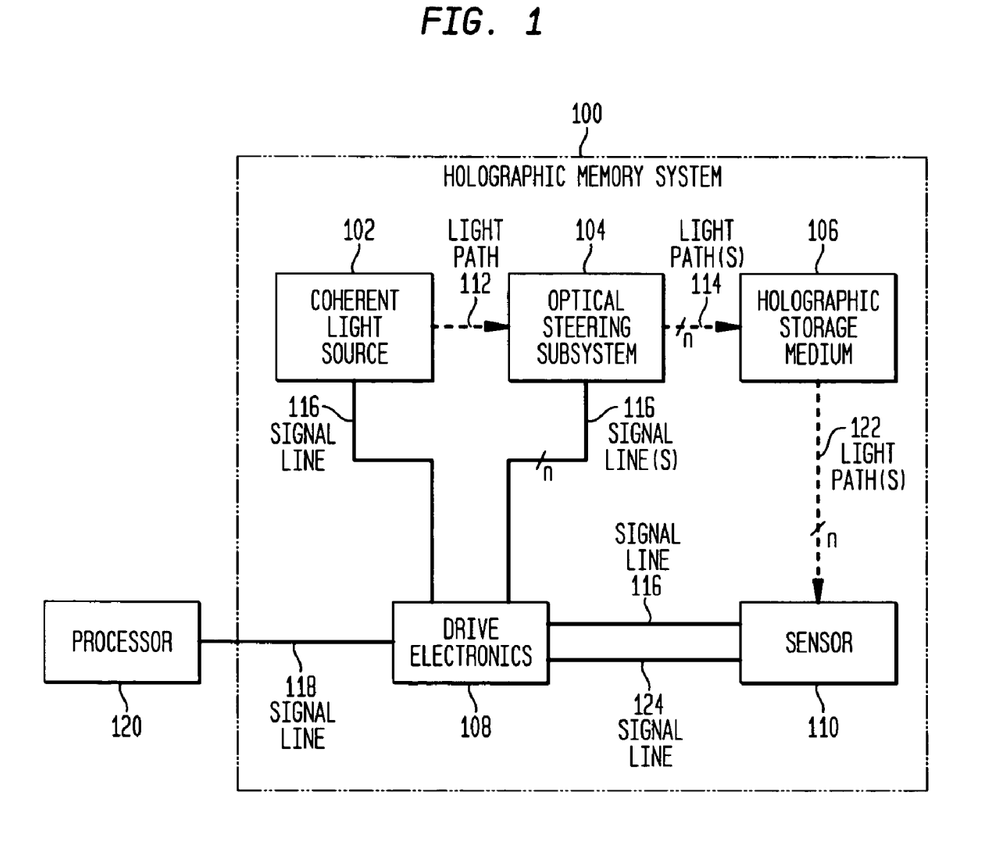
FIG. 1 is schematic block diagram of an exemplary holographic memory system in which embodiments of the present invention may be advantageously implemented.

As noted above, embodiments of the present invention may be used in holographic memory systems; that is, data storage and retrieval systems that implement holographic optical techniques. FIG. 1 is a block diagram of an exemplary holographic memory system in which embodiments of the present invention may be implemented. It should be appreciated that although embodiments of the present invention will be described in the context of the exemplary holographic memory system shown in FIG. 1, the present invention may be implemented in connection with any system now or later developed that implement holographic optical techniques.

Holographic memory system 100 receives along signal line 118 signals transmitted by an external processor 120 to read and write date to a photosensitive holographic storage medium 106. As shown in FIG. 1, processor 120 communicates with drive electronics 108 of holographic memory system 100. Processor 120 transmits signals based on the desired mode of operation of holographic system 100. For ease of description, the present invention will be described with reference to read and write operations of a holographic memory system. It should be apparent to one of ordinary skill in the art, however, that the present invention applies to other operational modes of a holographic memory system, such as Pre- Cure, Post-Cure, Write Verify, or any other operational mode implemented now or in the future in a holographic memory system.

Using control and data information from processor 120, drive electronics module 108 transmits signals along signal lines 116 to various components of holographic memory system 100. One such component that receives signals from drive electronics 108 is coherent light source 102. Coherent light source 102 may be any light source now or later developed that generates a coherent light beam. In one embodiment of the invention, coherent light source 102 is a laser.

The coherent light beam from light source 102 is directed along light path 112 into an optical steering subsystem 104. Optical steering subsystem 104 directs one or more coherent light beams along one or more light paths 114 to holographic storage medium 106. In the write operational mode described further below, at least two coherent light beams are transmitted along two light paths 114 to create an interference pattern in holographic storage medium 106. The interference pattern induces material alterations in storage medium 106 to form a hologram, as described in further detail below.

In the read operational mode, holographically-stored data is retrieved from holographic storage medium 106 by projecting a reconstruction or probe beam along one light path 114 into storage medium 106. The hologram and the reconstruction beam interact to reconstruct the data beam which is transmitted along light path 122. The reconstructed data beam is detected by a sensor 110. Sensor 110 may be any type of detector known or used in the art suitable for detecting a coherent light beam, such as a camera, photodetector, and the like.

The light detected at sensor 110 is converted to a signal and transmitted to drive electronics 108 via signal line 124. Processor 120 then receives the requested data and/or related information from drive electronics 108 via signal line 118.

Figure 2A:
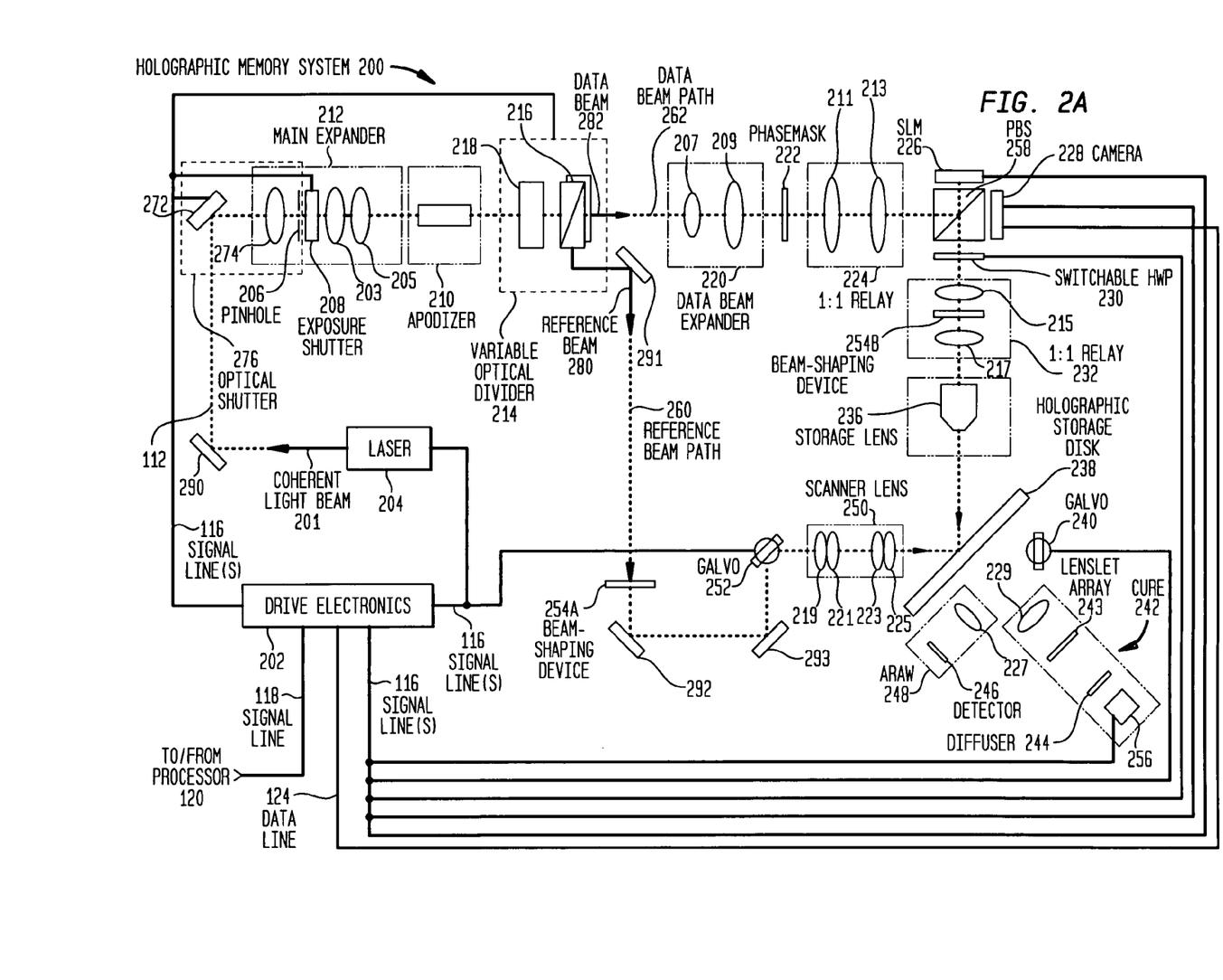
FIG. 2A is an architectural block diagram of the components of an exemplary holographic memory system illustrating the optical paths utilized during write operations in accordance with one embodiment of the present invention.
Figure 2B:
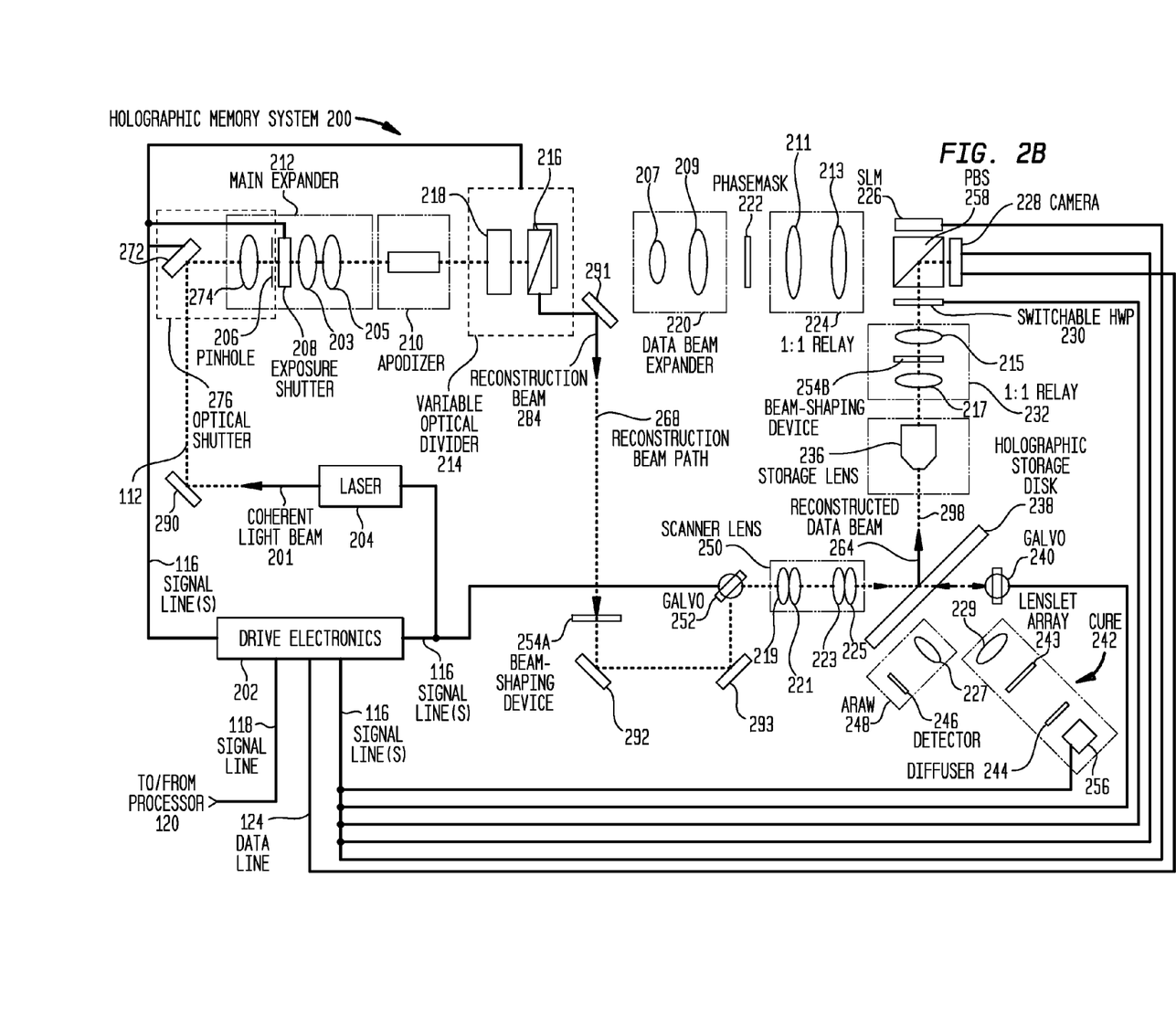
FIG. 2B is an architectural block diagram of the components of an exemplary holographic memory system illustrating the optical paths utilized during read operations in accordance with one embodiment of the present invention.

A more detailed description of the components of an exemplary embodiment of holographic memory system 100 is presented next below with reference to FIGS. 2A and 2B. This embodiment of holographic memory system 100 is referred to herein as holographic memory system 200. FIGS. 2A and 2B are similar schematic block diagrams of the components of one embodiment of holographic memory system 200 illustrating the optical paths utilized during write and read operations, respectively.

It should be appreciated by those of ordinary skill in the art that the embodiment of optical steering subsystem 104 depicted in FIGS. 2A and 2B is exemplary only and that the holographic memory system in which embodiments of the present invention may be implement may comprise other components to holographically store data in a photosensitive storage medium. For example, embodiments of the present invention may be implemented in an optical steering subsystem 104 that implements a hologram multiplexing scheme without any moving parts.

Referring to the write mode configuration illustrated in FIG. 2A, coherent light source 102 (FIG. 1) is a laser 204. Laser 204 receives via signal line 116 control signals from an embodiment of drive electronics 108 (FIG. 1), referred to as drive electronics 202. In the illustrated write mode configuration, such a control signal causes laser 204 to generate a coherent light beam 201 which is directed along light path 112, introduced above with reference to FIG. 1.

Coherent light beam 201 is reflected by mirror 290 and is directed through optical shutter 276. Optical shutter 276 comprises beam deviation assembly 272, focusing lens 274 and pinhole 206 that are collectively controllable to shutter coherent light beam 201 from entering the remainder of optical steering subsystem 104.

Coherent light beam 201 passing through optical shutter 276 enters main expander assembly 212. Main expander 212 includes lenses 203 and 205 to expand the light beam to a fixed diameter and to spatially filter the light beam. An exposure shutter 208 within main expander assembly 212 is an electromechanical device that controls recording exposure times.

Upon exiting main expander assembly 212, coherent light beam 201 is directed through an apodizer 210. As is well-known in the art, light emitted from a laser such as laser 204 has a generally Gaussian distribution of light. Apodizer 210 converts the Gaussian beam 201 from laser 204 into a more uniform beam with controlled edge profiles.

After passing through apodizer 210, coherent light beam 201 enters variable optical divider 214. Variable optical divider 214 uses a dynamically-controlled polarization device 218 and at least one polarizing beam splitter (PBS) 216 to redirect coherent light beam 201 into one or more discrete light beams transmitted along two light paths 114 (FIG. 1): light path 260 and light path 262. Variable optical divider 214 dynamically allocates the power of coherent light beam 201 among these discrete light beams 280, 282. In the write operational mode shown in FIG. 2A, the discrete light beam directed along light path 260 is the noted reference light beam, referred to as reference light beam 280 (also referred to herein as reference beam 280), while the discrete light beam directed along light path 262 is the noted data light beam, referred to as data light beam 282 (also referred to herein as data beam 282).

Upon exiting variable optical divider 214, reference beam 280 is reflected by mirror 291 and directed through beam-shaping device 254A positioned in reference path 260. Various embodiments of beam-shaping device 254A are described in greater detail below. After passing through beam shaping device 254A, reference beam 280 is reflected by mirrors 292 and 293 towards galvo mirror 252. Galvo mirror 252 reflects reference beam 280 into scanner lens assembly 250. Scanner lens assembly 250 has lenses 219, 221, 223 and 225 to pivotally direct reference beam 280 at holographic storage media 106, shown as holographic storage disk 238 in FIGS. 2A and 2B.

Returning attention to variable optical divider 214, data light beam 282 exits the variable optical divider and passes through data beam expander lens assembly 220. Data beam expander 220 implements lenses 207 and 209 to magnify data beam 282 to a diameter suitable for illuminating Spatial Light Modulator (SLM) 226, located further along data beam path 262. Data beam 282 then passes through phasemask 222 to improve the uniformity of the Fourier transform intensity distribution. Data beam 282 is then imaged to PBS 258 via 1:1 relay 224 having lenses 211 and 213. Data beam 282 is then directed to SLM 226 by PBS 258.

SLM 226 modulates data beam 282 to encode information into the data beam. SLM 226 receives the encoding information from drive electronics 202 via a signal line 116. Modulated data beam 282 is reflected from SLM 226 and passes through PBS 258 to a switchable half-wave plate 230. Switchable half-wave plate 230 is used to optionally retard the polarization of data beam 282 by 180 degrees. A 1:1 relay 232 containing beam-shaping device 254B and lenses 215 and 217 directs data beam 282 to storage lens 236 which produces a filtered Fourier transform of the SLM data inside holographic storage disk 238.

At a particular point within holographic storage disk 238, reference beam 280 and data beam 282 create an interference pattern to record a hologram in holographic storage disk 238.

Holographic memory system 100 further comprises an illuminative curing subsystem 242. Illuminative curing subsystem 242 is configured to provide a uniform curing light beam with reduced coherence to holographic storage disk 238 to pre-cure and/or post-cure a region of the storage medium. Illuminative curing subsystem 242 comprises a laser 256 sequentially aligned with a diffuser 244, a lenslet array 243 and a lens 229. Laser 256 provides a high intensity illuminative curing light beam that is incident on storage disk 238. The light from laser 256 is processed by diffuser 244, lenslet array 243, and lens 229 prior to reaching holographic storage disk 238.

Holographic system 100 additionally comprises an associative read after write (ARAW) subsystem 248. ARAW subsystem 248 is configured to partially verify a hologram soon after the hologram is written to storage medium 106. ARAW subsystem comprises a lens 227 and a detector 246. Holographic system 100 uses ARAW subsystem 248 by illuminating a written hologram with an all-white data page. When a hologram is illuminated by this all-white data page, ARAW subsystem 248 detects the reconstructed reference beam resulting from this all-white illumination. Specifically, detector 246 examines the reconstructed reference beam to verify that the hologram has been recorded correctly.

Referring to the read mode configuration illustrated in FIG. 2B, laser 204 generates coherent light beam 201 in response to control signals received from drive electronics 202. As noted above, coherent light 201 is reflected by mirror 290 through optical shutter 276 that shutters coherent light beam 201 from entering the remainder of optical steering subsystem 104. Coherent light beam 201 thereafter enters main expander assembly 212 which expands and spatially filters the light beam, as described above with reference to FIG. 2A. Upon exiting main expander assembly 212, coherent light 201 is directed through apodizer 210 to convert the Gaussian beam into a more uniform beam.

In the arrangement of FIG. 2B, when coherent light beam 201 enters variable optical divider 214, dynamically-controlled polarization device 218 and PBS 216 collectively redirect the coherent light beam into one discrete light beam 114, referred to as reconstruction beam 284. Reconstruction data beam 284 travels along reconstruction beam path 268, which is the same path 260 traveled by reference beam 280 during the write mode of operation, described above with reference to FIG. 2A.

A desired portion of the power of coherent light beam 201 is allocated to this single discrete light beam based on the selected polarization implemented in device 218. As will be described in detail below, in certain embodiments, all of the power of coherent light beam 201 is allocated to reconstruction light beam 284 to maximize the speed at which data may be read from holographic medium 238.

Upon exiting variable optical divider 214, reconstruction beam 284 is directed by mirror 291 through beam-shaping device 254A. As noted, beam-shaping device 254A is described further below.

After passing through beam-shaping device 254A, reconstruction beam 284 is directed to scanner lens 250 by mirrors 292 and 293, and galvo mirror 252. Scanner lens assembly 250 pivots reconstruction beam 284 at a desired angle toward holographic storage disk 238.

During the read mode, reconstruction beam 284 passes through holographic storage disk 238 and is retro-reflected back through the medium by a galvo mirror 240. As shown in FIG. 2B, the data reconstructed on this second pass through storage disk 238 is directed along reconstructed data beam path 298 as reconstructed data beam 264.

Reconstructed data beam 284 passes through storage lens 236 and 1:1 relay 232 to PBS 258, all of which are described above with reference to FIG. 2A. PBS 258 reflects reconstructed data beam 264 to an embodiment of sensor 110 (FIG. 1), here a camera 228. The light detected by camera 228 is converted to a signal and transmitted to drive electronics 202 via signal line 124, introduced above with reference to FIG. 1. Processor 120 then receives the requested data and/or related information from drive electronics 202 via signal line 118.

Embodiments of beam-shaping device 254A and 254B (collectively and generally referred to herein as beam-shaping device or devices 254) are described below with reference to the write operational mode of holographic memory system 200 illustrated in FIG. 2A. It would be apparent to one of ordinary skill in the art, however, to use the beam-shaping devices of the present invention in other operational modes of this or other embodiments of holographic memory system 100, such as read, Pre-Cure, Post-Cure, Write Verify, or any other operational mode implemented now or in the future.

Beam-shaping devices 254 will now be described in more detail with reference to FIGS. 3-9B. As noted, beam-shaping devices 254 are placed in the path of coherent light beams used to write holograms to a holographic storage medium 106 such as holographic storage disk 238. Beam-shaping devices 254 are generally represented by a beam-shaping device 300 illustrated in FIG. 3.

Figure 3:
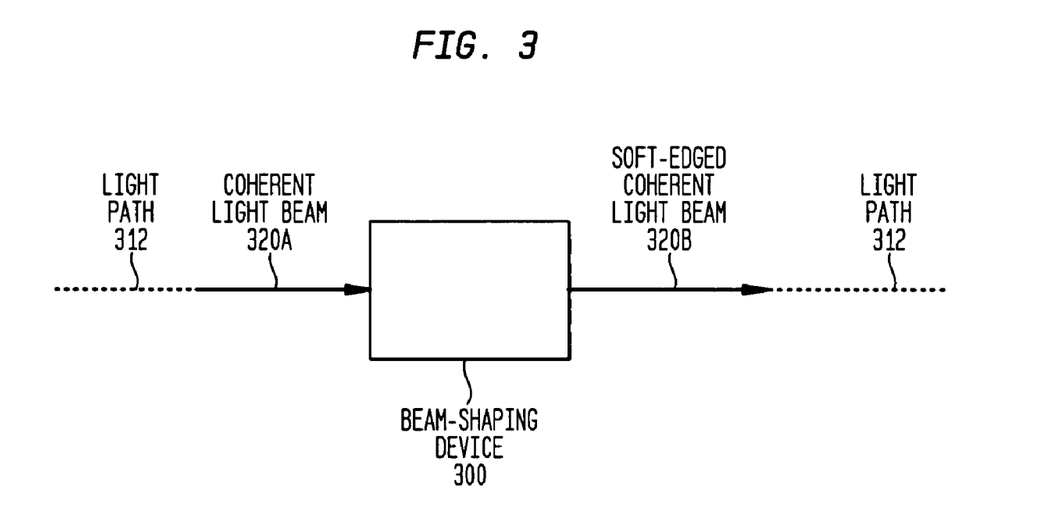
FIG. 3 is a block diagram of the beam-shaping devices in accordance with general aspects of the present invention.

As shown in FIG. 3, beam-shaping device 300 is positioned in a path 312 of coherent light beam 320A such that coherent light beam 320A impinges on beam-shaping device 300. Beam-shaping device 300 controls the transmission amplitude, or intensity, profile of coherent light beam 320A to generate soft-edged coherent light beam 320B that is a substantially diffraction noise-free coherent light beam.

Figure 4A:
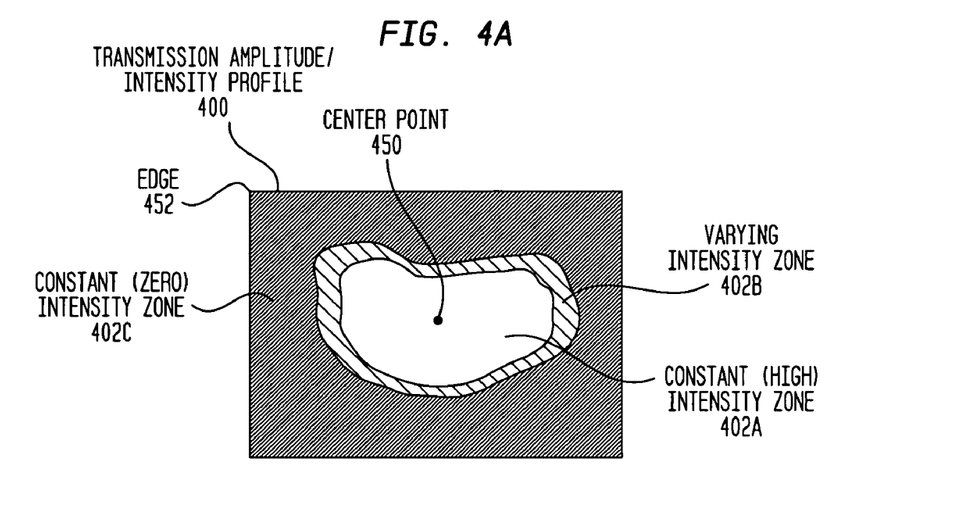
FIG. 4A is a two dimensional diagram illustrating the intensity of a coherent light beam after passing through a beam-shaping device in accordance with embodiments of the present invention.
Figure 4B:
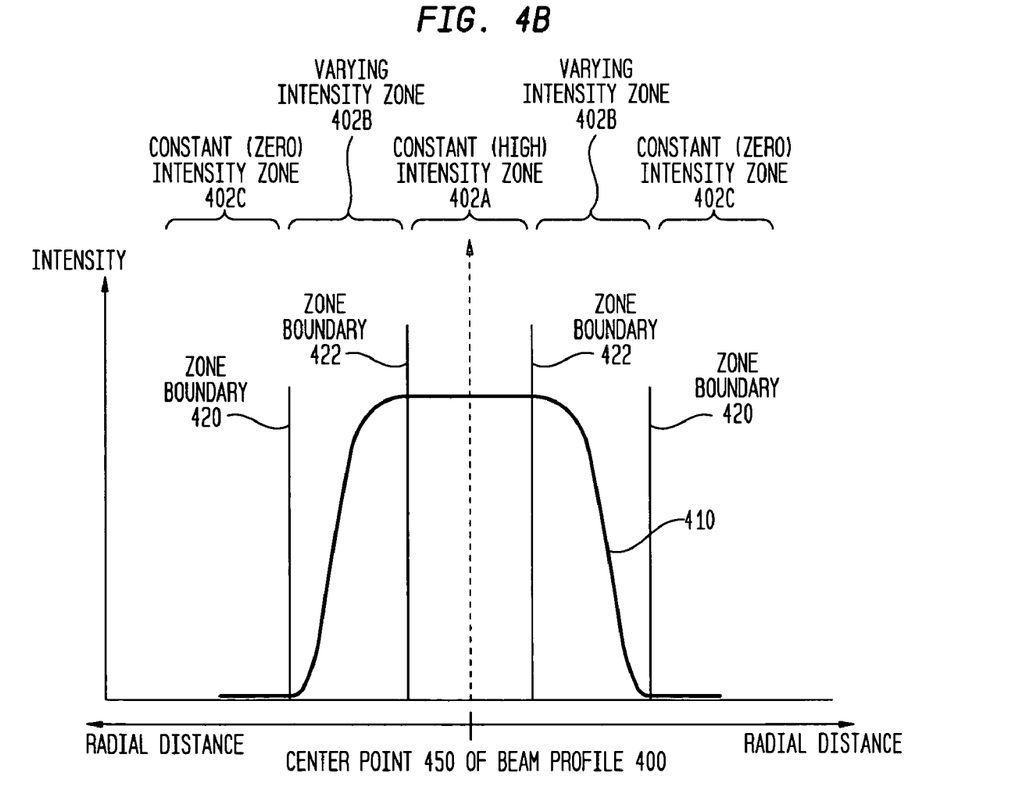
FIG. 4B is a graph illustrating the intensity of a coherent light beam versus distance from the center of the light beam illustrated in FIG. 4A in accordance with embodiments of the present invention.

FIGS. 4A and 4B illustrate the characteristics of a beam profile 400 of soft-edged coherent light beam 320B shaped by beam-shaping device 300. Beam profile 400 is shown in FIG. 4A as it would appear in a cross-sectional plane perpendicular to the direction of propagation. FIG. 4B is a graph illustrating the intensity of a coherent light beam versus distance from a center point 450 of beam profile 400 in accordance with embodiments of the present invention. The graph as illustrated in FIG. 4B is taken on an arbitrary line extending from center point 450 to an arbitrary point within outer zone 402.

Soft-edged coherent light beam 320B has a mathematically-continuous intensity profile 400 comprising a plurality of radially-successive circumferential intensity zones 402. Intensity zones 402 include constant intensity zones 402A and 402C, and a varying intensity zone 402B disposed between constant intensity zones 402A and 402C. The intensity of coherent light beam 320B in the varying intensity zone 402B changes gradually from the intensity of adjacent constant intensity zone 402A to the intensity of an opposing adjacent constant intensity zone 402C as described herein. Thus, the intensity profile 400 of the soft-edged coherent light beam 320B comprises intensity zones 402 having an intensity that is either substantially constant or transitions gradually along radially-extending lines from the center 450 to the edge 452 of the coherent light beam. Gradual, incremental changes in intensity profile 400 results in a coherent light beam 320B that is substantially free of various types of intensity noise, particularly intensity noise in the form of diffraction rings.

FIG. 4A is a two-dimensional diagram of beam profile 400 of soft-edged light beam 320B at holographic storage medium 238. It should be appreciated by one of ordinary skill in the art that the graph may vary depending on the arbitrary line chosen for illustration. It should also be appreciated by one of ordinary skill in the art, however, that beam profile 400 is illustrative of the beam profile taken at other points along soft-edged coherent light beam 320B. Furthermore, it should be appreciated that the substantially continuous beam profile of soft-edged beam 320B maintains its desired form for substantial distances depending on various factors such as the width of varying intensity zone 402B. For example, in some embodiments, soft-edged beam 320B emanating from beam-shaping device 300 maintains a substantially continuous beam profile for over 100 mm beyond beam-shaping device 300. It should also be appreciated by one of ordinary skill in the art that soft-edged beam 320B would maintain a substantially continuous profile for longer or shorter distances depending on the particular embodiment and application.

In the exemplary beam profile 400 illustrated in FIG. 4A, constant intensity zone 402C is a circumferential region of intensity beam profile 400 in which no coherent light is incident on holographic storage disk 238. In other words, the transmission amplitude of coherent light beam 320B has approximately no intensity in constant intensity zone 402C. This is illustrated in FIG. 4B in which intensity profile curve 410 has a substantially zero intensity value in constant (high) intensity zone 402A.

In contrast, constant intensity zone 402C is a circumferential region of profile 400 in which a high intensity coherent light is incident on holographic storage disk 238. In other words, the transmission amplitude of coherent light beam 320B in constant intensity zone 402C is approximately the same as that of coherent light beam 320A. That is, the intensity of coherent light beam 320B is essentially unaffected by beam-shaping device 300 within constant intensity zone 402A. This is illustrated in FIG. 4B as a substantially constant high intensity value of intensity profile curve 410 in constant (high) intensity zone 402A.

Varying intensity zone 402B, as noted, is a circumferential region of intensity profile 400 in which a coherent light 320B of varying intensity is incident on holographic storage disk 238. In accordance with the embodiment illustrated in FIG. 4B, beam-shaping device 300 shapes the intensity of beam profile 400 within varying intensity zone 402B to have the same high intensity at points closest to constant (high) intensity zone 402A, and the same low intensity at points closest to constant (low) intensity zone 402C.

Furthermore, beam-shaping device 300 shapes the intensity of coherent light beam 320A in varying intensity zone 402B so that the intensity of soft-edged coherent light beam 320B decreases at a gradual rate along radially-extending lines in intensity zone 402B. This rate of change is defined by the slope of profile curve 410 in region 402B. This slope of profile curve 410 is referred to herein as the transmission slope of intensity profile 400. Thus, as illustrated by profile curve 410 in FIG. 4B, soft-edged coherent light beam 320B has a mathematically-continuous intensity profile 400 comprising a plurality of radially-successive circumferential intensity zones 402.

Preferably, the width of varying intensity zone 402B and the mathematical function defining the shape of profile curve 410 are optimized to achieve a desired performance of beam-shaping device 300. For example, in some embodiments, the slope of tangent lines of profile slope 410 at zone boundary 422 between constant (high) intensity zone 402A and varying intensity zone 402B are approximately zero. Similarly, the slope of tangent lines taken at points on profile slope 410 at zone boundary 420 are also approximately zero. An approximately zero slope of these tangent lines allows for a continuous transition across boundaries 420, 422. Any discontinuities at boundaries 420 and 422 generate diffractive noise in soft-edged coherent light beam 320B.

Furthermore, in other embodiments, profile curve 410 at and immediately adjacent to boundaries 420 and 422 have the lowest frequency content possible. In one embodiment, profile curve 410 taken along one line radially extending from center 450 to edge 452 is a continuous, monotonic function, preferably having high order derivatives. In certain embodiments, profile curve 410 is sinusoidal, providing continuity to the first order derivative.

In some embodiments, the width of varying intensity zone 402B is dictated by the diffusion properties of the implemented holographic storage medium 106, such as holographic storage disk 238. In the case of photopolymer materials, varying intensity zone 402B is preferably sufficiently wide to mitigate unwanted monomer diffusion between sections of the holographic storage medium which are exposed to soft-edged coherent light beam 320B to sections of the holographic storage medium which are not exposed to soft-edged coherent light beam 320B. A narrower varying transition zone 402B results in a greater amount of monomer diffusion. However, a narrower varying transition zone 402B results in wasting less space within holographic storage medium 106 transitioning from high intensity to approximately zero intensity. Thus, each storage medium 106 requires some experimentation to determine the desired balance between wasted space and monomer diffusion. Similarly, in embodiments of the invention, this balance also varies for different write geometries and different write methods with holographic memory system 100. This substantially continuous beam profile having distinct intensity zones results in the mitigation of unwanted diffusion of monomer from sections of the storage medium that are exposed to soft-edged beam 320B to those sections that are not exposed.

Specific embodiments of beam-shaping device 300 will now be described in more detail with reference to FIGS. 5 through 9B. In the embodiment shown in FIG. 5, beam-shaping device 300 is referred to as a variable transmission apodizer 500. As noted, a coherent light beam 320A impinges on variable transmission apodizer 500 and is shaped or manipulated by variable transmission apodizer 500 to form soft-edged coherent light bean 320B. Variable transmission apodizer 500 comprises three radially-successive circumferential transmission zones: a low transmission zone 502C, a high transmission zone 502A, and a varying transmission zone 502B.

Figure 5:
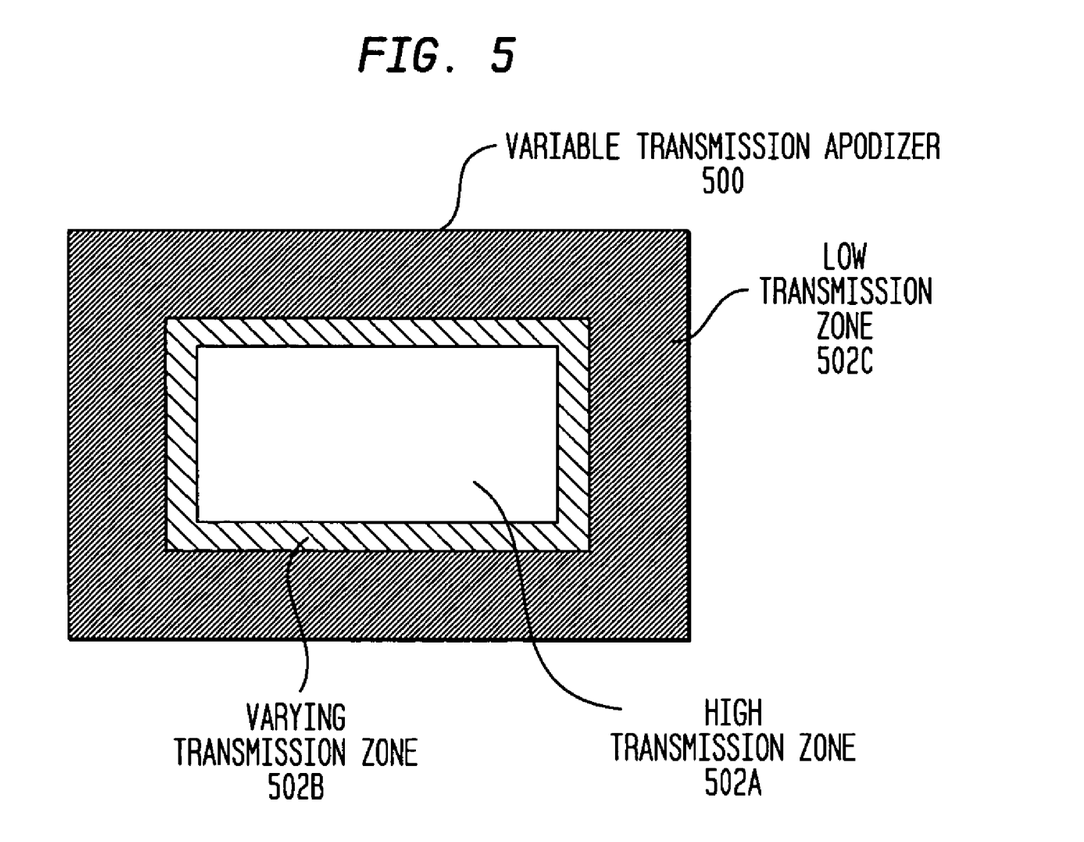
FIG. 5 is a schematic block diagram of the beam-shaping device in accordance with one embodiment of the present invention.

In the embodiment illustrated in FIG. 5, the intensity of a coherent light beam 320A incident on high transmission zone 502A is substantially transmitted through high transmission zone 502A. The light transmitted through high transmission zone 502A is approximately equal to the intensity of the incident coherent light beam 320A. The intensity of the light passing through high transmission zone 502A is represented by constant (high) intensity zone 402A shown in FIGS. 4A and 4B. As noted, the intensity of light transmitted by high transmission zone 502A is substantially constant across that zone.

In the embodiment shown in FIG. 5, a substantial portion of coherent light beam 320A incident on constant (low) intensity zone 402C will be reflected by intensity zone 402C and is thus blocked from passing through apodizer 500. The intensity of cohedrent light transmitted by low transmission zone 502C is represented by constant (zero) intensity zone 402C in FIGS. 4A and 4B where it is shown that approximately no light reaches the storage medium constant (zero) intensity zone 402C of intensity profile 400.

In accordance with the embodiment illustrated in FIG. 5, portions of coherent light beam 320A incident on varying transmission zone 504 will be partially transmitted to holographic storage disk 238. The intensity of cohedrent light transmitted by varying transmission zone 502B is represented by varying intensity zone 402B in FIGS. 4A and 4B where it is shown that the intensity of soft-edged coherent light beam 320B decreases at a gradual rate along radially-extending lines in varying intensity zone 402B.

As shown in FIG. 4B, varying transmission zone 502B transmits the greatest intensity of light at points closest to high transmission zone 502A. The intensity of light transmitted by varying transmission zone 502B then decreases at some rate towards no light transmission at zone 402.

Figure 6:
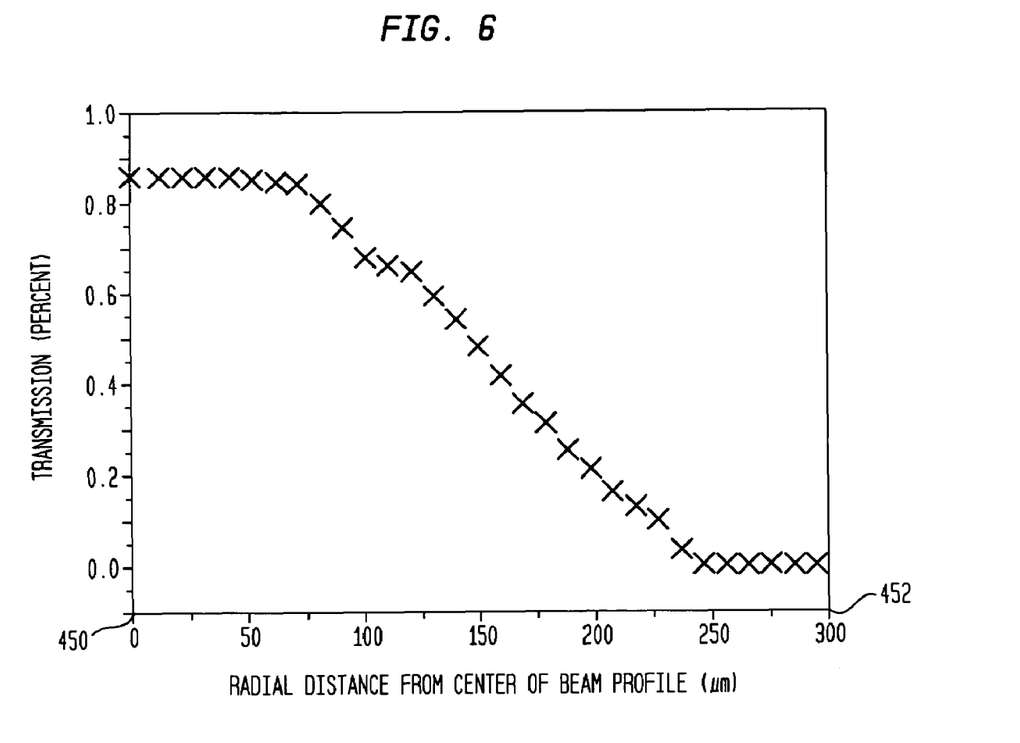
FIG. 6 is a graph illustrating the transmission of light through the beam-shaping device illustrated in FIG. 5.

FIG. 6 is a graph illustrating the transmission of light through variable transmission apodizer 500. In FIG. 6, the transmission of coherent light is shown as percent of transmission intensity of a light beam incident on variable transmission apodizer 500 versus radial distance along aperture 500 from central point 450 to edge 452.

As shown in FIG. 6, and described above with reference to FIG. 4B, the intensity of light transmitted by aperture 500 decreases from a high intensity within high intensity transmission zone 506 to approximately zero at low intensity transmission zone 502. In the specific embodiment shown in FIG. 6, the intensity of the light transmitted by varying transmission zone 504 decreases approximately by 85 percent over an approximate distance of 160 um.

Figure 7:
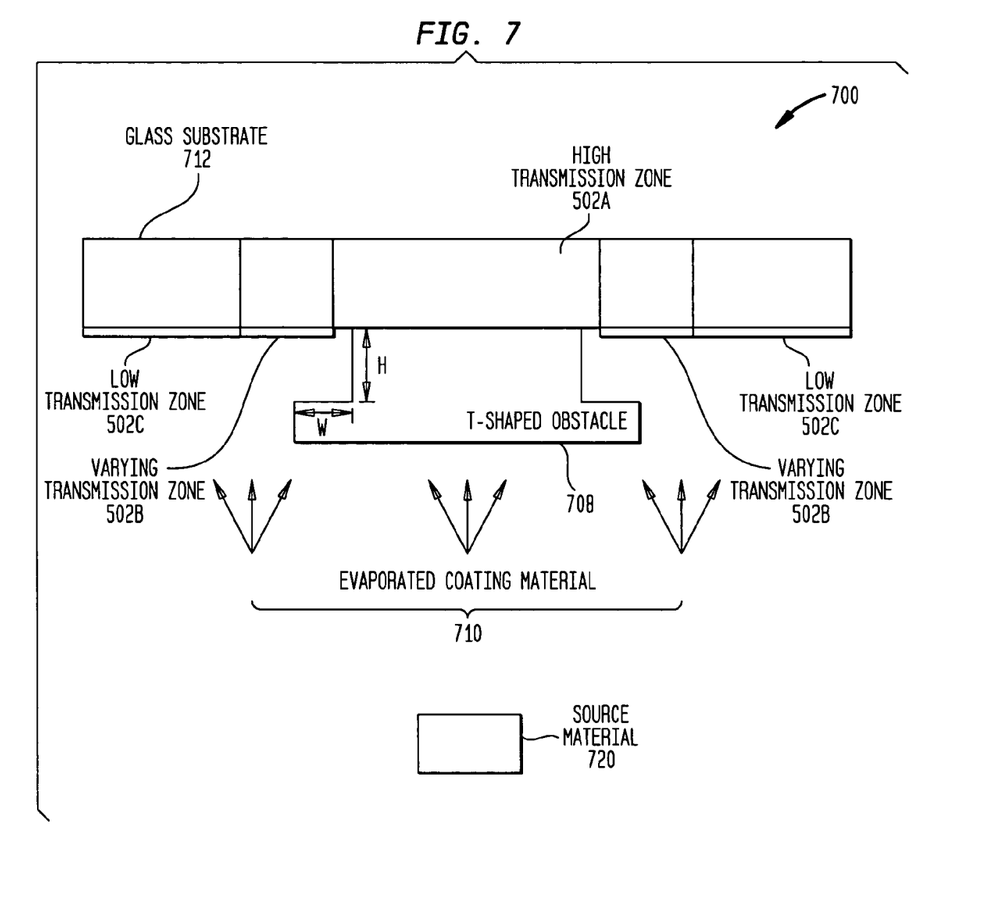
FIG. 7 is a schematic block diagram illustrating a method of manufacturing the beam-shaping device illustrated in FIG. 5 in accordance with one embodiment of the present invention.

FIG. 7 is a schematic block diagram illustrating a method of manufacturing a variable transmission apodizer 500 (FIG. 5). In this exemplary embodiment, a reflection coating process is used to manufacture variable transmission apodizer 500. Generally, as shown in FIG. 7, the reflection coating process evaporates a source material 720 under a vacuum and deposits evaporated coating material 710 on a substrate 712.

In one embodiment, substrate 712 is made of glass although in alternative embodiments other materials in addition to or instead of glass may be used. Source material 720 is positioned at a distance from substrate 712 sufficient to enable a uniform layer of evaporated coating material 710 to be applied to the entire surface of substrate 712. In some embodiments, process 700 uses a metal or metal composite as source material 720.

In the embodiment shown in FIG. 7, a T-shaped obstacle 708 is positioned on the surface of glass substrate 712 between source 720 and glass substrate 712 prior to commencing the coating process. T-shaped obstacle 708 affects only evaporated coating material 710 directed to certain areas of substrate 712. In accordance with the embodiment shown in FIG. 7, T-shaped obstacle 708 prevents evaporated coating material 710 from reaching the central part of glass substrate 712. The resulting area of glass substrate 712 that does not receive evaporated coating becomes high light intensity transmission zone 506 due to the absence of an evaporated coating. In contrast, an outer portion of glass substrate 712 receives a substantially even layer of evaporated coating material 710. This portion of glass substrate 712 becomes low intensity transmission zone 502 due to the presence of the evaporated coating.

As shown in FIG. 7, T-shaped obstacle 708 has a base for mounting on substrate 712 and an orthogonal top extending beyond the base to form an overhang. Two parameters are shown in FIG. 7. The H parameter refers to the height of the base while the W parameter is the length of the overhang of the top beyond the base.

The H and W parameters are chosen to create an area on glass substrate 712 having a layer of evaporated coating material 710 less dense than is applied to low intensity transmission zone 502. This area of glass substrate 712 has a layer of evaporated coating material 710 less dense than is applied to low intensity transmission zone 502 becomes varying transmission zone 504. Within varying transmission zone 504, the density of evaporated coating material 710 decreases steadily across varying transmission zone 504 reaching the lowest density at points closest to high intensity transmission zone 506. This progressively less dense layer of evaporated coating material 710 across varying intensity transmission zone 504 results in progressively greater amounts of light passing through varying intensity transmission zone 504 approaching high intensity transmission zone 506.

The H and W parameters of the T-shaped obstacle 508 control the width of varying intensity transmission zone 504 and thus control the rate at which varying transmission zone transitions from zero transmission to high transmission. This transition rate is the transmission slope 410 as described with reference to FIG. 4B. As explained above, because in preferred embodiments of the present invention, transmission slope 410 is carefully chosen for each particular application, in preferred embodiments the H and W parameters of T-shaped obstacle 708 are also carefully chosen.

In one specific embodiment of the present invention, T-shaped obstacle 708 has a H of 100 um and a W of 200 um. These particular H and W parameters result in transition zone 504 having a transmission profile as shown in FIG. 6. As shown in FIG. 6, the light transmitted by beam-shaping device 500 decreases as one moves along the soft edge towards low intensity transmission zone 502.

Another method of manufacturing a beam-shaping device in accordance with the embodiment illustrated in FIG. 5 is through the use of Electron Beam (E-Beam) Lithography. E-Beam lithography of the present invention refers to a lithographic process that uses focused beams of electrons to form a gray scale pattern with sub-micrometer features on a substrate.

In accordance with one embodiment of the present invention, a manufacturer could manufacture beam-shaping device 500 of the present invention simply from a desired two-dimensional profile such as shown in FIG. 4A.

Figure 8:
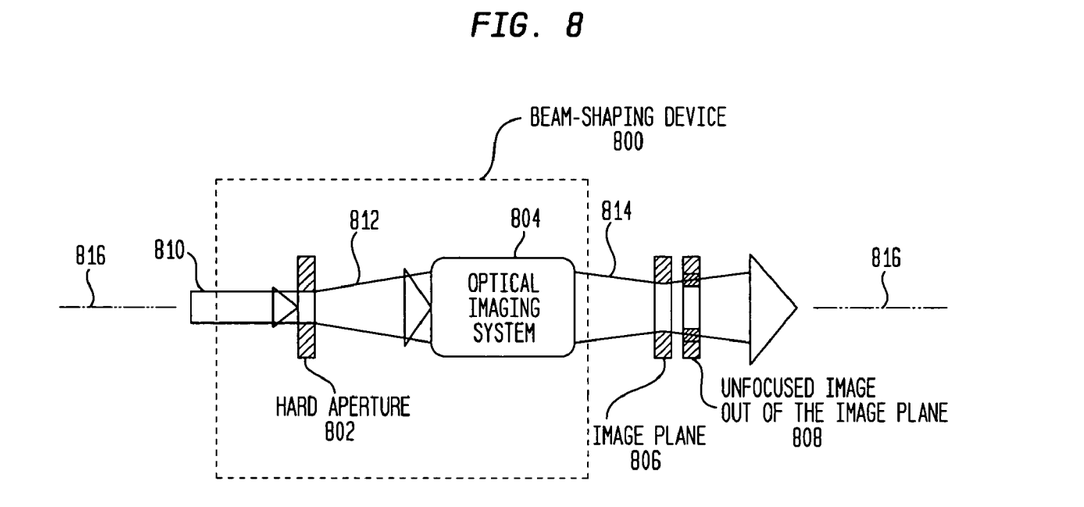
FIG. 8 is a schematic block diagram of the beam-shaping device in accordance with another embodiment of the present invention.

FIG. 8 is a schematic block diagram of the beam-shaping device in accordance with another embodiment of the present invention. In the embodiment shown in FIG. 5, beam-shaping device 300 is referred to as beam-shaping device 800. Beam-shaping device 800 comprises a non-sharp imaging arrangement. Non-sharp imaging arrangement 800 comprises a hard aperture 802 and an optical imaging system 804 sequentially aligned in light path 816.

In accordance with the embodiment of non-sharp imaging arrangement 800 illustrated in FIG. 8, a coherent light beam 810 is incident on hard aperture 802. Hard aperture 802 is placed at the object plane of optical imaging system 804. As coherent light beam 810 passes through hard aperture 802, coherent light beam diverges to become divergent coherent light beam 812. Divergent coherent light beam 812 then passes into optical imaging system 804. Coherent light beam 812 emerges from optical imaging system 804 as coherent light beam 814. Coherent light beam 814 will become a focused clear beam at image plane 806 of optical imaging system 804 as is shown in FIG. 8. However, coherent light beam 814 will be an unfocused, blurry beam at points outside image plane 806. At points close to image plane 806, unfocused and blurry beam 814 has the characteristics of a soft-edged beam as illustrated in FIGS. 4A and 4B. For example, at point 808 of FIG. 8, light beam 814 has a continuous beam profile with a predetermined transition from approximately zero intensity to approximately full intensity. In preferred embodiments of the invention, optical system 804 is engineered in a manner to provide a soft-edged beam throughout storage medium 106.

Figure 9A:
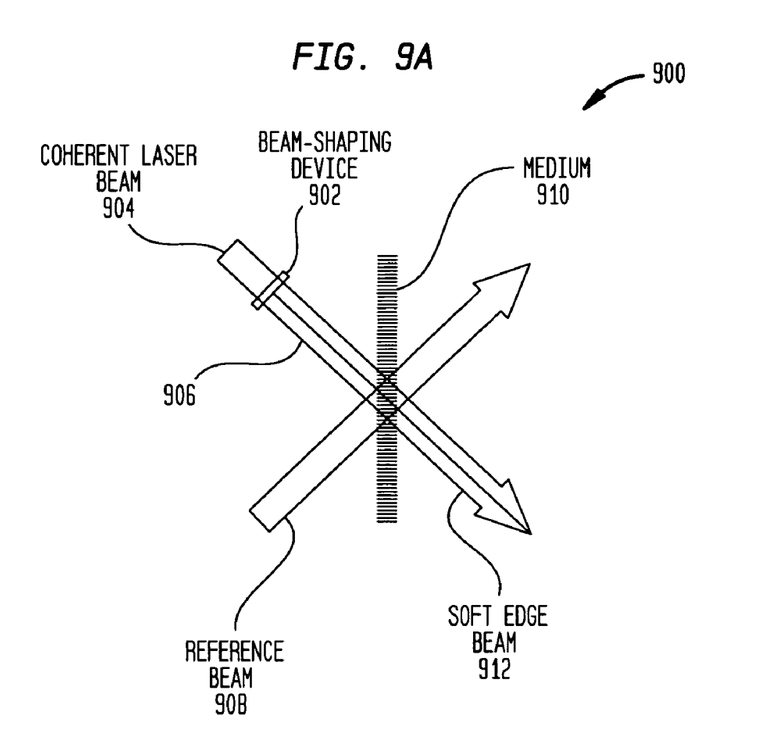
FIG. 9A is a schematic diagram of one embodiment of the manufacturing of a holographic optical element beam-shaping device in accordance with one embodiment of the present invention.
Figure 9B:
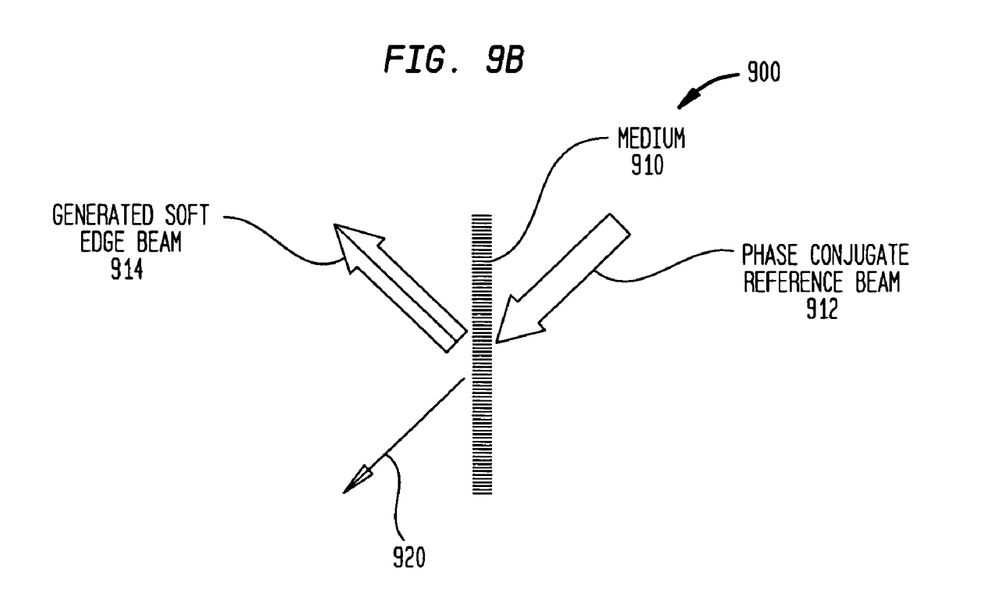
FIG. 9B is a schematic block diagram illustrating the use of the holographic beam shaping device illustrated in FIG. 9A, in accordance with the embodiment of the present invention.

FIGS. 9A and 9B illustrate another embodiment of the beam-shaping devices of the present invention. In the embodiment shown in FIG. 9B, beam-shaping 300 is referred to as beam-shaping device 900. As explained with reference to FIG. 3, a coherent light beam 320A impinges on beam-shaping device 900 and is shaped by beam-shaping device 900 into soft-edged beam 320B. In the embodiment illustrated in FIG. 9A, beam-shaping device 900 comprises a Holographic Optical Element (HOE).

As shown in FIG. 9A, HOE 900 of this embodiment is formed by recording a hologram into a holographic medium 910. The hologram is recorded into medium 910 by interfering a reproducible reference beam 908 and a shaped soft-edged beam 906 within holographic medium 910. In this embodiment, soft-edged beam 906 used to record the hologram in holographic medium 910 is formed by passing coherent light beam 904 through a beam-shaping device 902. In general aspects of the embodiment shown in FIG. 9A, beam-shaping device 902 comprises a beam-shaping device as described with reference to FIG. 3 configured to produce soft-edged beam 912. In accordance with another embodiment shown in FIG. 9A, beam-shaping device 902 comprises soft-edged aperture 500 as described with reference to FIGS. 5-7. In a still further embodiment of the present invention as illustrated in FIG. 9A, beam-shaping device 902 comprises beam-shaping device 800 as described with reference to FIG. 8. In accordance with embodiments of the present invention, soft-edged beam 906 is a beam having a beam profile comprising a plurality of distinct, radially-successive circumferential intensity zones as described above in relation to FIGS. 4A and 4B.

Reference beam 908 and soft-edged beam 906 interfere with each other within holographic medium 910 to record a hologram. When this recorded hologram is read with reference beam 912, soft-edged beam 914 will be reconstructed as shown in FIG. 9B. In embodiments of the invention, reference beam 912 should have the same characteristics as reference beam 908.

In particular embodiments of the present invention, the hologram is read in phase conjugation mode. In this embodiment, the hologram is read with the reverse of one of the beams used to record the hologram. This reading with a reverse beam results in the reconstruction of the reverse of the other recording beam.

It should be appreciated by one of ordinary skill in the art that embodiments of the present invention may use more than three distinct intensity zones.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A holographic system comprising:
a photosensitive storage medium configured to holographically-store information;
a source of a coherent light beam; and
an optical steering subsystem for directing said coherent light beam to said storage medium, comprising:
at least one beam-shaping device positioned in the path of one or more coherent light beams traveling through said optical steering subsystem, said at least one beam-shaping device configured to shape the coherent light beam into a substantially diffraction noise-free coherent light beam having predetermined dimensions and a continuous light beam profile of distinct intensity zones;
wherein said beam-shaping device comprises:
a holographic optical element having a hologram stored therein, wherein said holographic optical element is configured to form said shaped diffraction noise-free coherent light beam having predetermined dimensions and a continuous beam profile having a plurality of distinct, radially-successive circumferential intensity zones.

2. A holographic system comprising:
a photosensitive storage medium configured to holographically-store information;
a source of a coherent light beam; and
an optical steering subsystem for directing said coherent light beam to said storage medium, comprising:
at least one beam-shaping device positioned in the path of one or more coherent light beams traveling through said optical steering subsystem, said at least one beam-shaping device configured to shape the coherent light beam into a substantially diffraction noise-free coherent light beam having predetermined dimensions and a continuous light beam profile of distinct intensity zones;
wherein said beam-shaping device comprises:
a holographic optical element; and
a holographic storage medium having a hologram stored therein,
wherein said holographic optical element is configured to form said shaped diffraction noise-free coherent light beam having predetermined dimensions and a continuous beam profile having a plurality of distinct, radially-successive circumferential intensity zones.

3. The device of claim 1, wherein said plurality of distinct radially-successive circumferential intensity zones comprise three distinct intensity transmission zones.

4. The device of claim 3, wherein said three distinct transmission zones comprise:
a high intensity transmission zone configured to transmit a high intensity of said incident coherent light beam there through;
a low intensity transmission zone configured to transmit approximately zero intensity of said incident coherent light beam; and
a varying intensity transmission zone positioned between said high intensity transmission zone and said low intensity transmission, configured to transmit a varying intensity of said incident coherent light beam; and
wherein the intensity of light transmitted by said varying intensity transmission zone decreases at some rate across said zone from a high intensity of light transmission near said high intensity transmission zone to approximately zero intensity at said low intensity transmission zone.

5. The system of claim 1, wherein the hologram stored in the holographic optical element is formed by interfering a reproducible reference beam and a shaped soft-edged beam within the holographic optical element.

6. The system of claim 1, wherein said beam shaping device comprises: a glass substrate having a plurality of distinct intensity transmission zones corresponding to the plurality of distinct, radially-successive circumferential intensity zones.

7. The system of claim 2, wherein said plurality of distinct radially-successive circumferential intensity zones comprise three distinct intensity transmission zones.

8. The system of claim 7, wherein said three distinct transmission zones comprise:
   a high intensity transmission zone configured to transmit a high intensity of said incident coherent light beam there through;
   a low intensity transmission zone configured to transmit approximately zero intensity of said incident coherent light beam; and
   a varying intensity transmission zone positioned between said high intensity transmission zone and said low intensity transmission, configured to transmit a varying intensity of said incident coherent light beam; and
   wherein the intensity of light transmitted by said varying intensity transmission zone decreases at some rate across said zone from a high intensity of light transmission near said high intensity transmission zone to approximately zero intensity at said low intensity transmission zone.

9. The system of claim 2, wherein the hologram stored in the holographic storage medium is formed by interfering a reproducible reference beam and a shaped soft-edged beam within the holographic storage medium.

10. The system of claim 2, wherein said beam shaping device comprises:
    a glass substrate having a plurality of distinct intensity transmission zones corresponding to the plurality of distinct, radially-successive circumferential intensity zones.

11. The system of claim 1, wherein the hologram to be recorded in the photosensitive storage medium is recorded in the photosensitive storage medium by interfering the diffraction noise-free coherent light beam and a reproducible reference beam.

12. The system of claim 11, wherein the substantially diffraction noise-free coherent light beam is read with the coherent light beam.

13. The system of claim 12, wherein the coherent light beam is the same as the reproducible reference beam.

14. The system of claim 11, wherein the hologram of the beam-shaping device is read in phase conjugation mode with the coherent light beam incident on the holographic optical element in the reverse direction as the reproducible reference beam used to record the hologram.

15. The system of claim 14, wherein the coherent light beam is the same as the reproducible reference beam.

* * * * *